United States Patent
Aizawa et al.

(10) Patent No.: US 7,672,848 B2
(45) Date of Patent: Mar. 2, 2010

(54) ELECTRONIC MAIL PROCESSING APPARATUS AND ELECTRONIC MAIL PROCESSING METHOD, AND PROGRAM AND STORAGE MEDIUM

(75) Inventors: Michio Aizawa, Kanagawa (JP); Tsuyoshi Yagisawa, Kanagawa (JP); Makoto Hirota, Tokyo (JP); Yasuhiro Komori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1197 days.

(21) Appl. No.: 10/965,779

(22) Filed: Oct. 18, 2004

(65) Prior Publication Data

US 2005/0120083 A1 Jun. 2, 2005

(30) Foreign Application Priority Data

Oct. 23, 2003 (JP) .............................. 2003-363576

(51) Int. Cl.
*G10L 21/00* (2006.01)
(52) U.S. Cl. .................................... 704/270; 379/88.13
(58) Field of Classification Search .................. 704/270; 379/88.13
See application file for complete search history.

(56) References Cited

U.S. PATENT DOCUMENTS 6,289,085 B1 * 9/2001 Miyashita et al. ........ 379/88.02
6,411,685 B1 * 6/2002 O'Neal ..................... 379/88.14
6,603,837 B1 * 8/2003 Kesanupalli et al. ...... 379/88.17
6,625,576 B2 * 9/2003 Kochanski et al. .......... 704/260
7,302,395 B2 * 11/2007 Dong ......................... 704/275
2001/0043594 A1 * 11/2001 Ogawa et al. ............... 370/356
2002/0156601 A1 * 10/2002 Tu et al. ..................... 702/188

FOREIGN PATENT DOCUMENTS

| JP | 05-233493 A | 9/1993 |
|----|-------------|--------|
| JP | 06-139164 A | 5/1994 |
| JP | 06-342409 A | 12/1994 |
| JP | 10-136093   | 5/1998 |
| JP | 10-320317   | 12/1998 |
| JP | 10-334002 A | 12/1998 |
| JP | 2003-044413 | 2/2003 |
| JP | 2003-076643 | 3/2003 |

* cited by examiner

*Primary Examiner*—Susan McFadden
(74) *Attorney, Agent, or Firm*—Fitzpatrick, Cella, Harper & Scinto (57) ABSTRACT

An information processing technique for voice outputting an electronic mail, received by an information processing apparatus capable of voice output, at a sender's intended timing. For this purpose, the information processing apparatus has an electronic mail reception unit (101) to receive an electronic mail, an electronic mail selection unit (102) to select an electronic mail including a code describing voice output timing, from electronic mails received by the electronic mail reception unit (101), and a voice synthesis unit (104) to voice-synthesize the electronic mail selected by the electronic mail selection unit (102) and voice-outputs the result of voice synthesis based on the code.

3 Claims, 9 Drawing Sheets

From : MICHI TARO

Subject : DRAMA

Date : 2002/11/30

To : HOUSE

<READING : 20:50>

DRAMA STARTS
AT 21 O'CLOCK..

FIG. 8

From : MICHI RIKO

Subject : RESPONSE

Date : 2002/12/3

To : HOUSE

<RESPONSE MESSAGE>

I' AM ABSENT FROM HOME.
PLEASE RECORD YOUR
MESSAGE.

FIG. 9

AUTOMATIC READING TO BE PERFORMED?

Yes  No

ELECTRONIC MAIL PROCESSING APPARATUS AND ELECTRONIC MAIL PROCESSING METHOD, AND PROGRAM AND STORAGE MEDIUM

FIELD OF THE INVENTION

The present invention relates to a technology for processing a received electronic mail.

BACKGROUND OF THE INVENTION

Conventionally, numerous methods using electronic mails have been known as simple means of operating of various information processing apparatuses. For example, Japanese Patent Application Laid-Open No. 10-334002 discloses transferring an electronic mail to another network. Japanese Patent Application Laid-Open No. 6-139164 discloses updating an address book. Japanese Patent Application Laid-Open No. 6-342409 discloses changing a schedule. Further, Japanese Patent Application Laid-Open No. 5-233493 discloses management of computer.

However, in the above respective conventional technologies, application of such technologies to an information processing apparatus capable of voice output is not disclosed.

On the other hand, it is generally possible to voice-output a transmitted electronic mail on the receiving apparatus. However, the voice output cannot be performed at a sender's intended timing. Rather, the timing of the voice output of the transmitted electronic mail is determined by the receiving apparatus.

SUMMARY OF THE INVENTION

The present invention has been made in consideration of the above problem, and has its object to provide an information processing technology for voice output of an electronic mail, received by an information processing apparatus capable of voice output, at a sender's intended timing.

To attain the above object, the information processing apparatus according to the present invention has the following construction.

That is, provided is an information processing apparatus comprising:
reception unit configured to receive an electronic mail;
selection unit configured to select an electronic mail including a code describing voice output timing from electronic mails received by the reception unit; and
output unit configured to voice-synthesize the electronic mail selected by the selection unit, and voice-outputting the result of voice synthesis based on the code.

In accordance with the present invention as described above, an electronic mail received in an information processing apparatus capable of voice output can be voice-outputted at a sender's intended timing.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
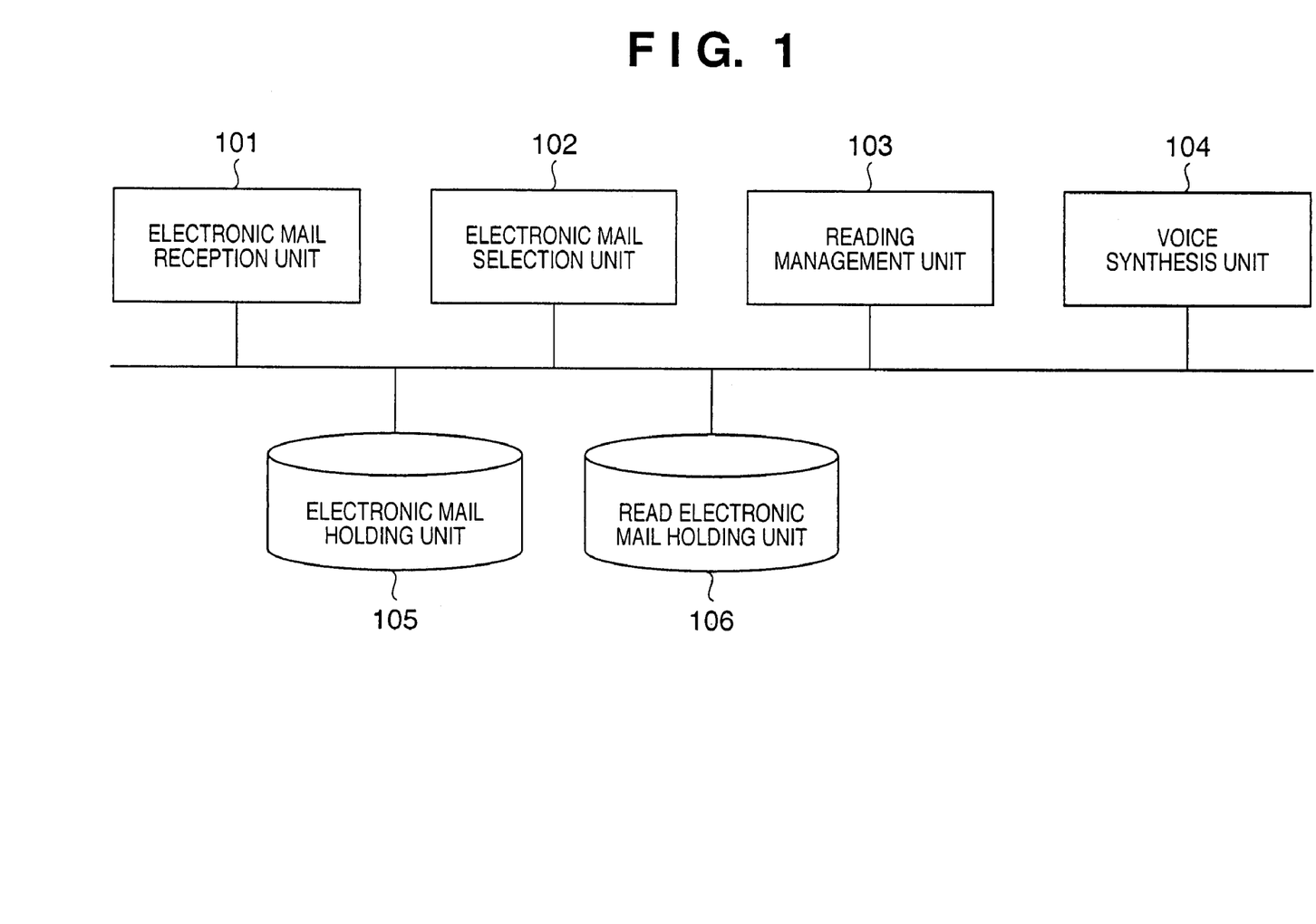
FIG. 1 is a functional block diagram showing the construction of an information processing apparatus according to a first embodiment of the present invention.

FIG. 1 is a functional block diagram showing the construction of an information processing apparatus according to a first embodiment of the present invention. In FIG. 1, reference numeral 101 denotes an electronic mail reception unit to receive an electronic mail; 102, an electronic mail selection unit to select an electronic mail including a particular code from received electronic mails; 103, a reading management unit to manage timing of reading an electronic mail; 104, a voice synthesis unit to perform language processing and sound processing on input text, and output synthetic voice; 105, an electronic mail holding unit to hold a received electronic mail; and 106, a read electronic mail holding unit to hold an electronic mail which is selected by the electronic mail selection unit 102 and will be read by the voice synthesis unit 104.

Hereinbelow, implementation of the functions shown in FIG. 1 in a facsimile apparatus having electronic mail function and voice output function will be described.

Figure 2:
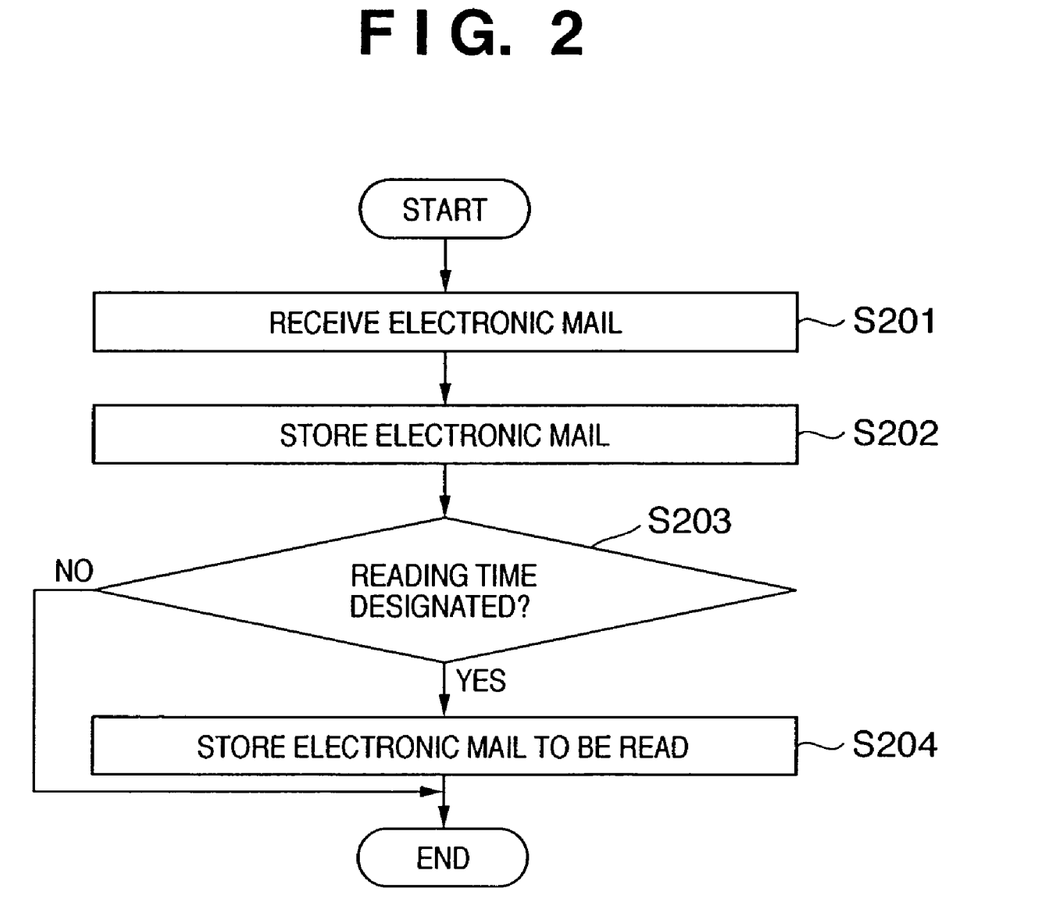
FIG. 2 is a flowchart showing a processing procedure for selecting an electronic mail that includes reading time in the information processing apparatus according to the first embodiment.

FIG. 2 is a flowchart showing a processing procedure for selecting an electronic mail that includes reading time as a particular code, in the information processing apparatus (facsimile apparatus having electronic mail function and voice output function) according to the first embodiment of the present invention.

When the electronic mail function is executed, the electronic mail reception unit 101 receives an electronic mail at step S201. Then at step S202, the received electronic mail is held in the electronic mail holding unit 105. The electronic mail held in the electronic mail holding unit 105 is managed by the electronic mail selection unit 102 and the reading management unit 103 which respectively function as parts of the electronic mail function.

Figure 7:
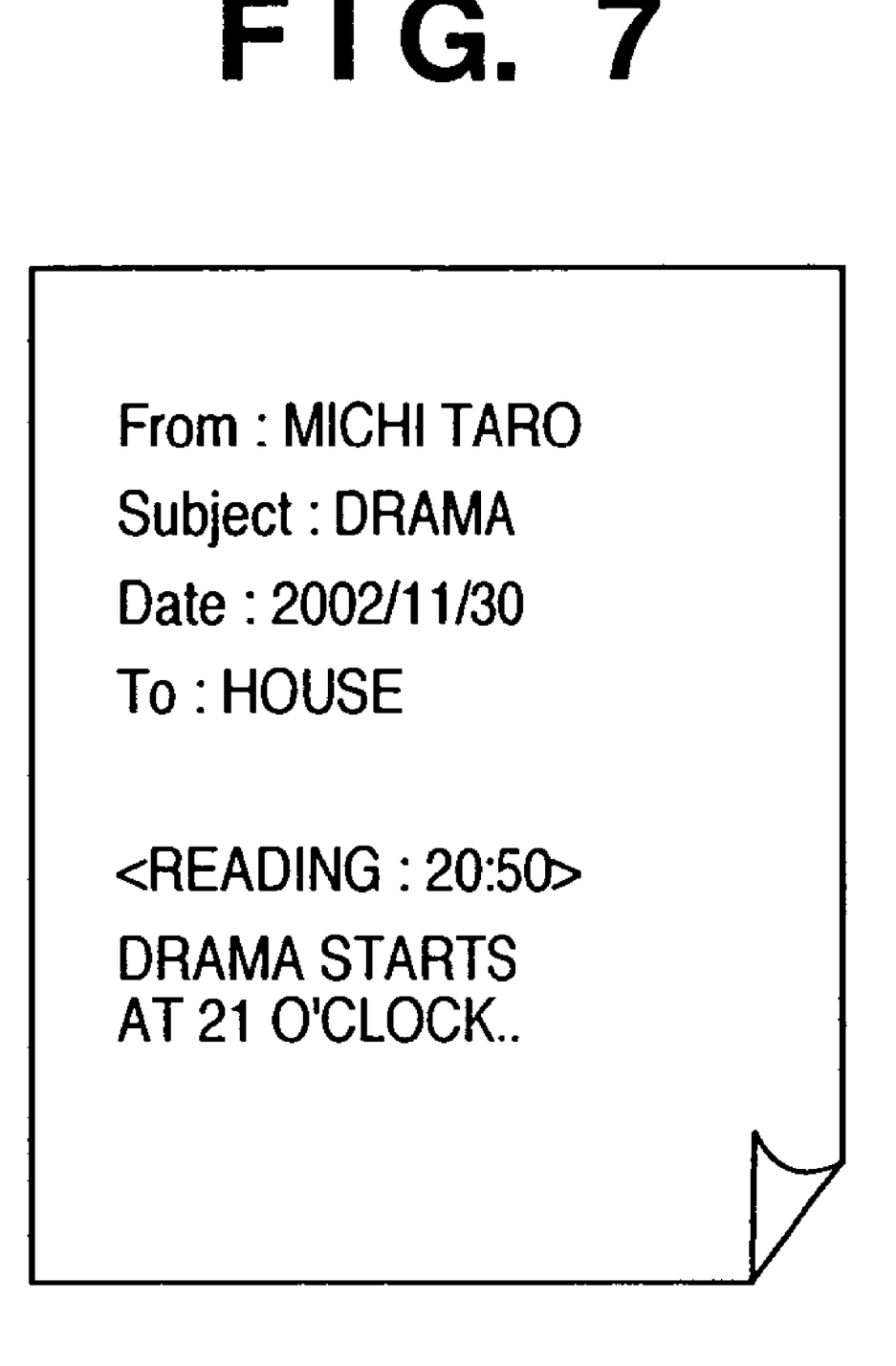
FIG. 7 is an example of electronic mail that includes a code designating reading time received by the information processing apparatus according to the first embodiment.

At step S203, it is determined by the electronic mail selection unit 102 whether or not main text of the electronic mail includes a particular code designating reading time. The reading time is designated by a set of letters, e.g., "<Reading 20:50>" as shown in FIG. 7. Further, the reading time may be designated with predetermined binary data such as image data representing time. If a particular code designating reading time is included in the main text, the process proceeds to step S204, while if a particular code is not included, the process ends.

At step S204, a duplicate of the received electronic mail is stored in the read electronic mail holding unit 106, and the process ends.

Figure 3:
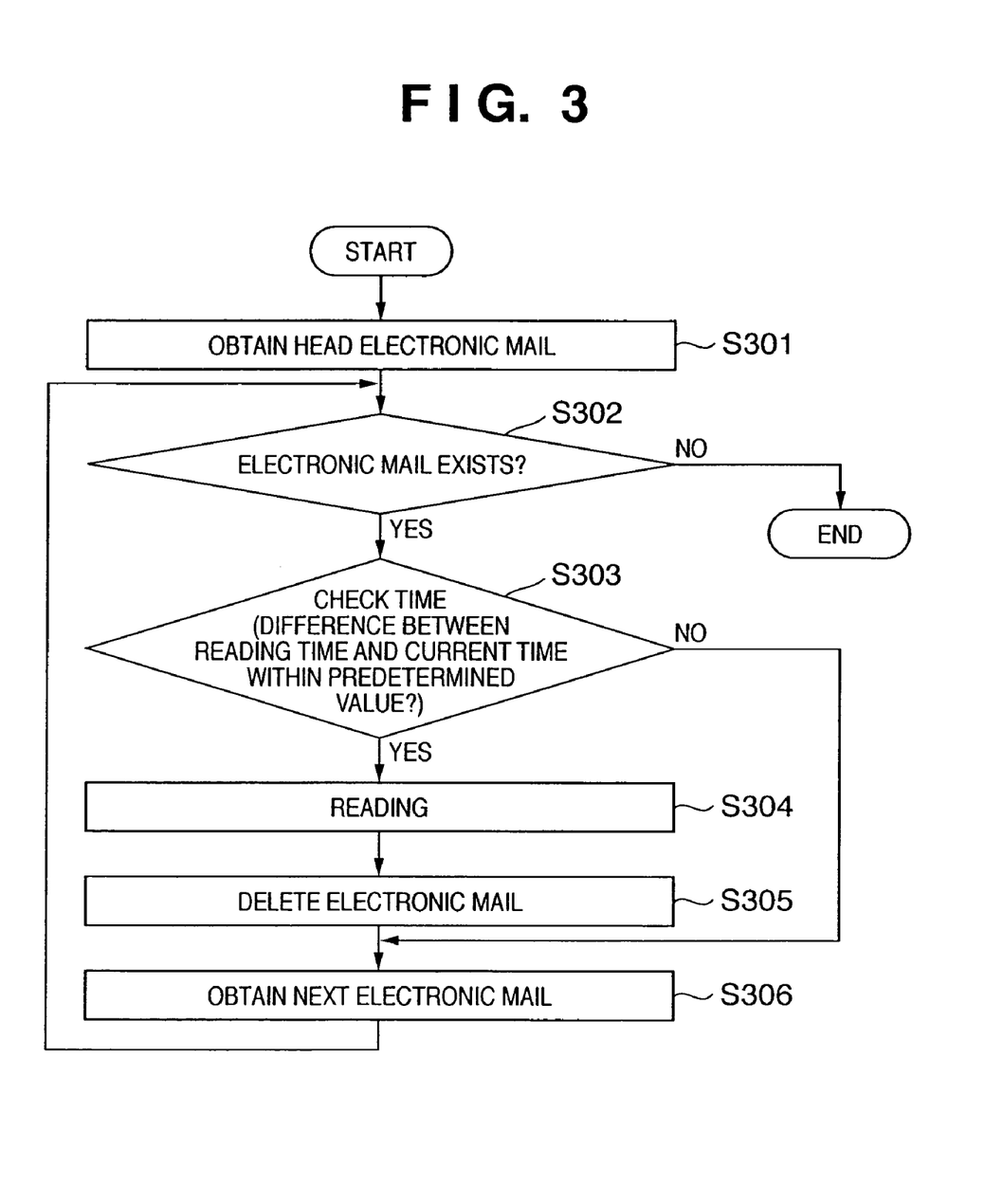
FIG. 3 is a flowchart showing a processing procedure for reading an electronic mail at reading time in the information processing apparatus according to the first embodiment.

FIG. 3 is a flowchart showing a processing procedure for reading an electronic mail at reading time in the information processing apparatus (facsimile apparatus having electronic mail function and voice output function) according to the embodiment. This processing is performed periodically (e.g., by 30 sec).

At step S301, a reading management unit 103 retrieves the first electronic mail in order from electronic mails held in the read electronic mail holding unit 106. Note that if an electronic mail has been retrieved at step S301, the process proceeds to step S303, while if an electronic mail has not been read, the process ends (step S302).

At step S303, the reading management unit 103 compares reading time included in the main text of the electronic mail with current time. If the difference between the reading time and the current time is within a predetermined value (e.g., 1 minute), the process proceeds to step S304, while if the difference exceeds the predetermined value, the process proceeds to step S306.

AT step S304, the retrieved electronic mail is synthesized by the voice synthesis unit 104, and the result of voice synthesis is outputted via a speaker of the facsimile apparatus. Further, at step S305, the voice-outputted electronic mail is deleted from the read electronic mail holding unit 106. At step S306, the reading management unit 103 retrieves the next electronic mail from the read electronic mail holding unit 106, and the process returns to step S302.

As described above, according to the present embodiment, in the information processing apparatus (facsimile apparatus) having electronic mail function and voice output function, an electronic mail can be read at time designated in the electronic mail by a sender.

Second Embodiment

In the first embodiment, voice output is made via the speaker of the facsimile apparatus. However, the present invention is not limited to this arrangement. In the second embodiment, the functions as shown in FIG. 1 are realized in a facsimile apparatus having electronic mail function and automatic telephone answering function, and voice output is made as a response message via the automatic telephone answering function.

Figure 4:
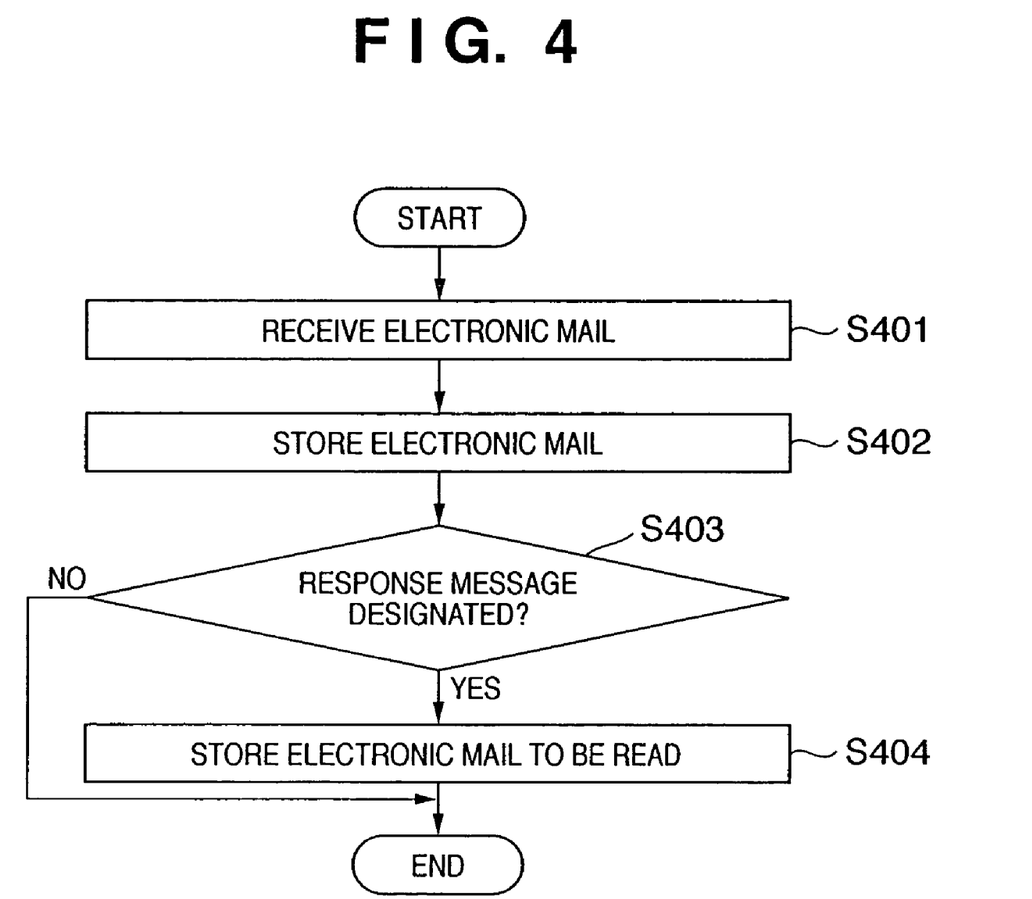
FIG. 4 is a flowchart showing a processing procedure for selecting an electronic mail that includes a code designating the setting of response message in the information processing apparatus according to a second embodiment of the present invention.

FIG. 4 is a flowchart showing a processing procedure for selecting an electronic mail that includes a code designating a response message setting in the information processing apparatus (facsimile apparatus having electronic mail function and automatic telephone answering function) according to the second embodiment.

When the electronic mail function has operated, at step S401, the electronic mail reception unit 101 receives an electronic mail. Then at step S402, the received electronic mail is held in the electronic mail holding unit 105. The electronic mail held in the electronic mail holding unit 105 is managed by the electronic mail selection unit 102 and the reading management unit 103 which respectively function as parts of the electronic mail function.

Figure 8:
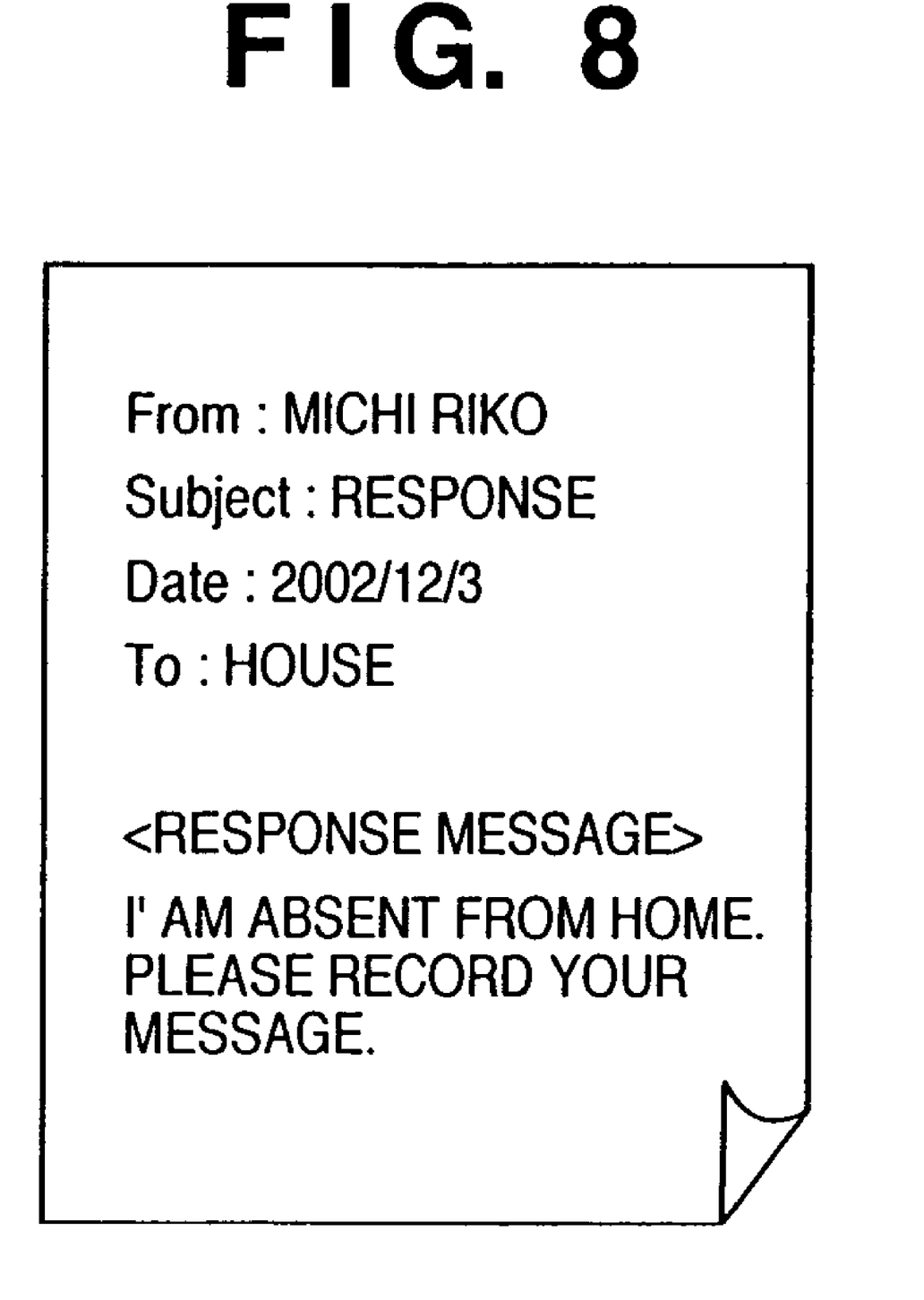
FIG. 8 is an example of electronic mail that includes a code designating response message setting received by the information processing apparatus according to the second embodiment.

At step S403, it is determined by the electronic mail selection unit 102 whether or not main text of the electronic mail includes a particular code designating the setting of response message. The setting of response message is designated as, e.g., "<Response message>" as shown in FIG. 8. If a particular code designating the setting of response message is included in the main text, the process proceeds to step S404, while if a particular code is not included, the process ends.

At step S404, a duplicate of the received electronic mail is stored in the read electronic mail holding unit 106, and the process ends.

Figure 5:
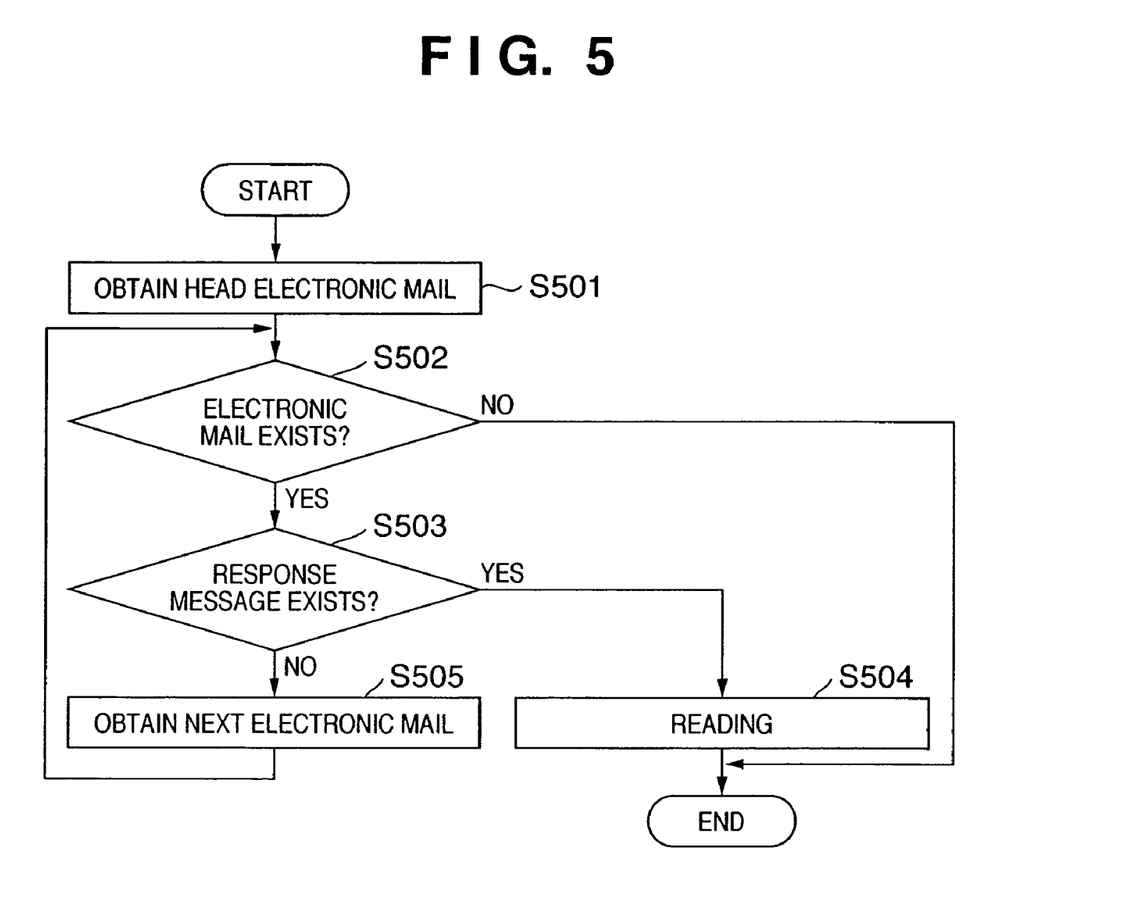
FIG. 5 is a flowchart showing a processing procedure for reading an electronic mail as a response message in the information processing apparatus according to the second embodiment.

FIG. 5 is a flowchart showing a processing procedure for reading an electronic mail as a response message in the information processing apparatus (facsimile apparatus having electronic mail function and voice output function) according to the present embodiment. This processing is called when, e.g., output of response message is required in an automatic telephone answering function of facsimile apparatus.

At step S501, the reading management unit 103 retrieves the first electronic mail in order from electronic mails held in the read electronic mail holding unit 106. If an electronic mail has been read at step S501, the process proceeds to step S503, while no electronic mail has been retrieved at step S501, the process ends (step S502). Note that if no electronic mail has been retrieved, a default response message is outputted from the facsimile apparatus onto a telephone line or the like.

At step S503, it is determined in the reading management unit 103 whether or not main text of the electronic mail includes a code designating setting of response message. If a code designating setting of response message is included in the main text, the process proceeds to step S504, while if a code designating setting of response message is not included in the main text, the process proceeds to step S505.

At step S504, the retrieved electronic mail is voice-synthesized in the voice synthesis unit 104, then the result of voice synthesis is outputted onto the telephone line, and the process ends. At step S505, the next electronic mail is retrieved by the reading management unit 103 from the read electronic mail holding unit 106, then the process returns to step S502.

As it is apparent from the above description, according to the present embodiment, in the information processing apparatus (facsimile apparatus) having electronic mail function and automatic telephone answering function, a response message in the automatic telephone answering function can be set by an electronic mail, and the content of the mail can be voice-outputted at a mail sender's intended timing (timing of response in the automatic telephone answering function).

Third Embodiment

In the above first and second embodiments, voice output is performed based on a particular code (reading time designating code or response message setting designating code) included in an electronic mail, regardless of a receiving side user's operation. It may be arranged such that voice output is performed in accordance with the receiving side user's operation as in the case of prior art.

Figure 6:
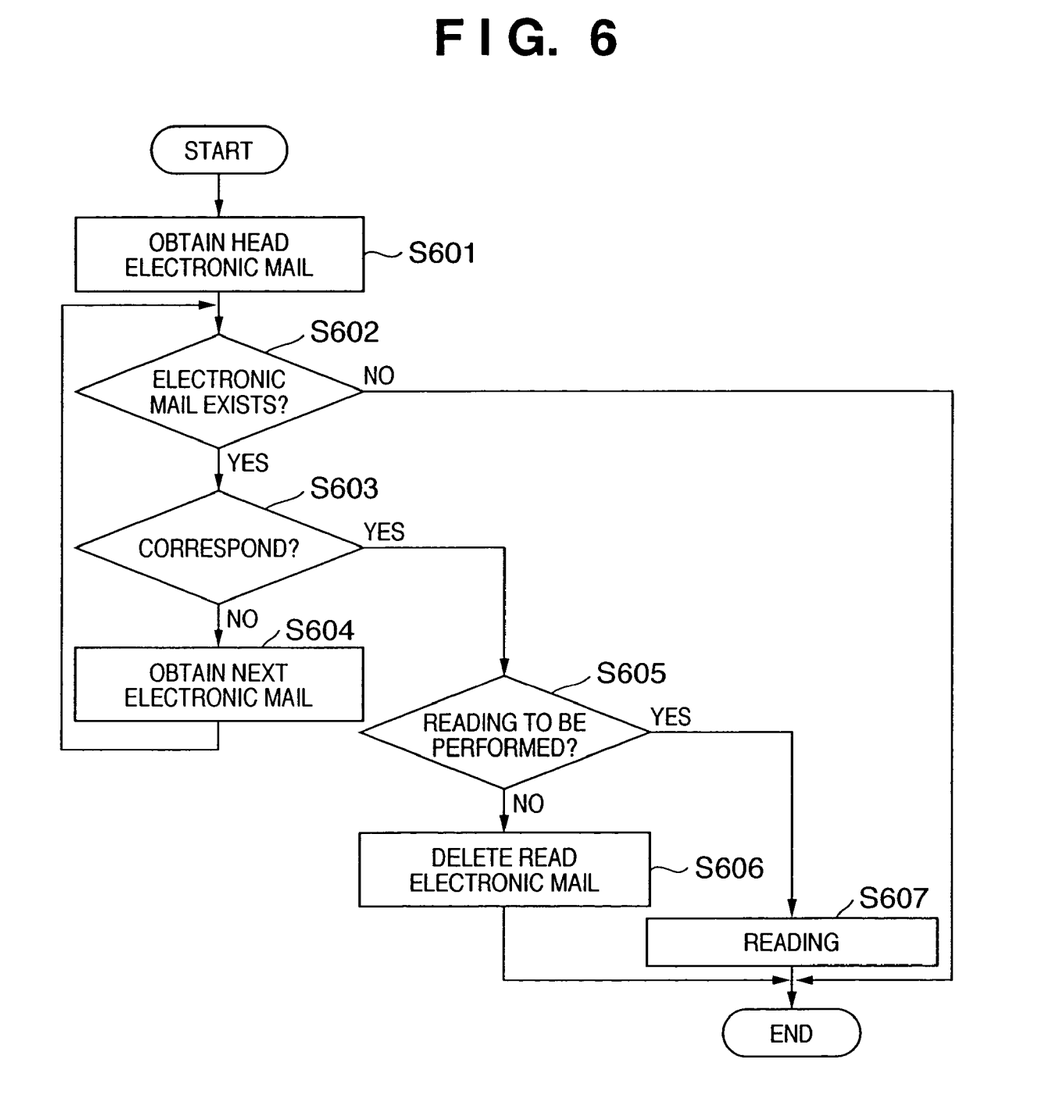
FIG. 6 is a flowchart showing a processing procedure for checking if each electronic mail is read or not in the information processing apparatus according to a third embodiment of the present invention.

FIG. 6 is a flowchart showing a processing procedure for checking if each electronic mail is read or not in the information processing apparatus (facsimile apparatus having electronic mail function and voice output function) according to the third embodiment. This processing is carried every time an electronic mail held in the electronic mail holding unit 105 is browsed in the electronic mail function of the facsimile apparatus.

At step S601, the reading management unit 103 retrieves the first electronic mail in order from electronic mails held in the read electronic mail holding unit 106. If an electronic mail has been retrieved at step S601, the process proceeds to step S603, while no electronic mail has been retrieved at step S601, the process ends (step S602).

At step S603, it is determined in the reading management unit 103 whether or not the retrieved electronic mail is identical to a electronic mail which is currently being browsed. If the retrieved electronic mail is identical to the electronic mail which is being browsed, the process proceeds to step S605, while if the retrieved electronic mail is different from the electronic mail which is being browsed, the process proceeds to step S604, at which the next electronic mail is retrieved from the read electronic mail holding unit 106.

Figure 9:
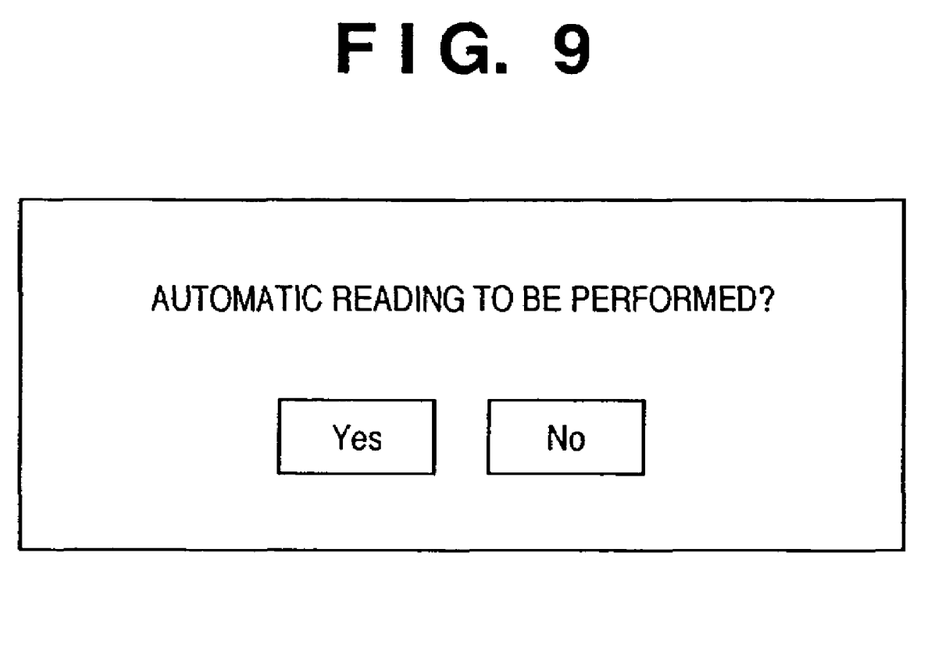
FIG. 9 is an example of a display panel to check if the system read the electronic mail displayed in the information processing apparatus according to the third embodiment.

If the retrieved electronic mail is identical to the electronic mail which is being browsed, it is determined at step S605 whether or not the retrieved electronic mail is to be read. The determination is made by asking the user's selection with the display panel in FIG. 9 and determining the user's selection by the reading management unit 103. If the user has selected Yes, the process proceeds to step S607, at which reading is performed, and process proceeds. If the user has selected No, the process proceeds to step S606. At step S606, the retrieved electronic mail is deleted from the read electronic mail holding unit 106, and the process ends.

As apparent from the above description, according to the present embodiment, voice output can be performed every time the receiving side user browses an electronic mail. Further, the information processing apparatus (facsimile apparatus) having electronic mail function and voice output function may be used as a simple reminder by asking a user's selection to perform or not to perform voice output, and reading or deleting an electronic mail based on the user's instruction.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realize the functions according to the embodiments, and the storage medium storing the program code constitutes the invention.

Further, the storage medium, such as a floppy disk (registered trademark), a hard disk, an optical disk, a magneto-optical disk, a CD-ROM, a CD-R, a magnetic tape, a non-volatile type memory card, and a ROM can be used for providing the program code.

Additionally, aside from aforesaid functions according to the above embodiments that are realized by executing the program code which are read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

The present invention is not limited to the above embodiments and various changes and modifications can be made within the spirit and scope of the present invention. Therefore, to appraise the public of the scope of the present invention, the following claims are made.

Claim of Priority

This application claims priority from Japanese Patent Application No. 2003-363576 filed on Oct. 23, 2003, the entire contents of which are incorporated by reference herein.

What is claimed is:

1. An information processing apparatus comprising:
a reception unit configured to receive electronic mails;
a first holding unit configured to hold the received electronic mails;
a first determination unit configured to determine whether or not each of the electronic mails held in said first holding unit includes a code describing a reading time as a voice output time designated by a sender of each of the electronic mails;
a second holding unit configured to, when said first determination unit determines that an electronic mail includes the code describing the voice output time designated by the sender of the electronic mail, copy the electronic mail from said first holding unit and hold the electronic mail;
a second determination unit configured to compare the voice output time included in the electronic mail held in said second holding unit with a current time and determine whether or not a difference time between the voice output time and the current time is within a predetermined value; and
an output unit configured to, when said second determination unit determines that the difference time is within the predetermined value, voice-synthesize the electronic mail held in said second holding unit and delete the electronic mail voice-synthesized by said output unit from said second holding unit.

2. An information processing method comprising:
a reception step of receiving electronic mails;
a first holding step of holding the received electronic mails in a first holding unit;
a first determination step of determining whether or not each of the electronic mails held in the first holding unit includes a code describing a reading time as a voice output time designated by a sender of each of the electronic mails;
a second holding step of, when it is determined in said first determination step that an electronic mail includes the code describing the voice output time designated by the sender of the electronic mail, copying the electronic mail from the first holding unit and holding the electronic mail in a second holding unit;

a second determination step of comparing the voice output time included in the electronic mails held in the second holding unit with a current time and determining whether or not a difference time between the voice output time and the current time is within a predetermined value; and an output step of, when it is determined in said second determination step that the difference time is within the predetermined value, voice-synthesizing the electronic mail held in the second holding unit and deleting the electronic mail voice-synthesized in said output step from the second holding unit.

3. A storage medium holding a control program for realizing the information processing method according to claim 2 by a computer.

* * * * *